(12) United States Patent
Yu et al.

(10) Patent No.: US 11,246,040 B2
(45) Date of Patent: ***Feb. 8, 2022

(54) COMMUNICATION METHOD AND SYSTEM IN WIRELESS COMMUNICATION SYSTEM USING BEAMFORMING SCHEME

(71) Applicant: Samsung Electronics Co., Ltd., Suwon-si (KR)

(72) Inventors: Hyunkyu Yu, Suwon-si (KR); Cheol Jeong, Seongnam-si (KR); Taeyoung Kim, Seongnam-si (KR); Jeongho Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 95 days.

This patent is subject to a terminal disclaimer.

(21) Appl. No.: 16/665,453

(22) Filed: Oct. 28, 2019

(65) Prior Publication Data

US 2020/0068417 A1 Feb. 27, 2020

Related U.S. Application Data

(63) Continuation of application No. 15/323,853, filed as application No. PCT/KR2015/007184 on Jul. 10, 2015, now Pat. No. 10,462,680.

(30) Foreign Application Priority Data

Jul. 10, 2014 (KR) ........................ 10-2014-0087008

(51) Int. Cl.
*H04W 16/28* (2009.01)
*H04L 1/16* (2006.01)
(Continued)

(52) U.S. Cl.
CPC .............. *H04W 16/28* (2013.01); *H04B 7/04* (2013.01); *H04B 7/0639* (2013.01);
(Continued)

(58) Field of Classification Search
CPC ....... H04W 16/28; H04B 7/04; H04B 7/0639; H04B 7/0656; H04B 7/0695; H04L 1/16; H04L 5/005; H04L 5/0055
See application file for complete search history.

(56) References Cited

U.S. PATENT DOCUMENTS 8,644,765 B1* 2/2014 Zhang ................. H04B 7/0617
455/63.4
10,462,680 B2* 10/2019 Yu ......................... H04L 5/0055
(Continued)

FOREIGN PATENT DOCUMENTS

CN 103780359 A 5/2014
GN 103875271 A 6/2014
(Continued)

OTHER PUBLICATIONS

European Office Action dated May 22, 2019, issued in the European Application No. 15 819 568.5.
(Continued)

*Primary Examiner* — Chi H Pham
*Assistant Examiner* — Weibin Huang
(74) *Attorney, Agent, or Firm* — Jefferson IP Law, LLP

(57) ABSTRACT

A transmission method for communication by a transmission apparatus of a wireless communication system performing wireless communication in a beamforming scheme is disclosed. The method may include assigning identifiers to all transmission beam directions in which transmission is possible and transmitting a reference signal with a beam identifier assigned in each direction, when identifier information of a beam direction, which allows reception from a
(Continued)

reception apparatus, and error detection information are received, examining the error detection information to examine whether an error exists, and transmitting a response signal to the reception apparatus according to whether the examined error exists, and transmitting and receiving data on the basis of the received beam information when the error does not exist, as a result of the examination of the error detection information.

16 Claims, 7 Drawing Sheets

(51) Int. Cl.
    *H04B 7/04*         (2017.01)
    *H04B 7/06*         (2006.01)
    *H04L 5/00*         (2006.01)

(52) U.S. Cl.
    CPC ......... *H04B 7/0656* (2013.01); *H04B 7/0695* (2013.01); *H04L 1/16* (2013.01); *H04L 5/005* (2013.01); *H04L 5/0055* (2013.01)

(56) References Cited

U.S. PATENT DOCUMENTS

| | | | |
|---|---|---|---|
| 2008/0012764 A1* | 1/2008 | Kang | H04B 7/0634 342/367 |
| 2008/0214229 A1* | 9/2008 | Lim | H04W 52/241 455/522 |
| 2008/0232494 A1 | 9/2008 | Pan et al. | |
| 2009/0006925 A1 | 1/2009 | Pan | |
| 2010/0246494 A1 | 9/2010 | Sanayei et al. | |
| 2011/0076955 A1 | 3/2011 | Uno et al. | |
| 2011/0085503 A1 | 4/2011 | Nam et al. | |
| 2011/0268100 A1 | 11/2011 | Gorokhov et al. | |
| 2011/0280188 A1* | 11/2011 | Jeon | H04B 7/0413 370/328 |
| 2012/0045003 A1 | 2/2012 | Li et al. | |
| 2012/0076040 A1* | 3/2012 | Hoshino | H04W 24/10 370/252 |
| 2012/0327882 A1* | 12/2012 | Park | H04B 7/0632 370/329 |
| 2013/0040684 A1* | 2/2013 | Yu | H04L 5/0048 455/517 |
| 2013/0051364 A1 | 2/2013 | Seol et al. | |
| 2013/0072243 A1 | 3/2013 | Yu et al. | |
| 2013/0229307 A1 | 9/2013 | Chang et al. | |
| 2013/0258885 A1 | 10/2013 | Yu et al. | |
| 2013/0286960 A1 | 10/2013 | Li et al. | |
| 2013/0315321 A1 | 11/2013 | Rajagopal et al. | |
| 2014/0056256 A1 | 2/2014 | Kim et al. | |
| 2014/0105054 A1 | 4/2014 | Saegrov et al. | |
| 2016/0043781 A1* | 2/2016 | Cho | H04B 7/0408 342/373 |
| 2017/0094531 A1* | 3/2017 | Kakishima | H04W 24/10 |

FOREIGN PATENT DOCUMENTS

| | | |
|---|---|---|
| KR | 10-2013-0017562 A | 2/2013 |
| KR | 10-2013-0030225 A | 3/2013 |
| KR | 10-2013-0052036 A | 5/2013 |
| KR | 10-2013-0100733 A | 9/2013 |
| KR | 10-2013-0110078 A | 10/2013 |

OTHER PUBLICATIONS

Chinese Office Action dated Jan. 3, 2020, issued in Chinese Application No. 201580037785.2.
Korean Office Action dated Jan. 17, 2021, issued in Korean Application No. 10-2014-0087008.

* cited by examiner

ND SYSTEM
COMMUNICATION METHOD AND SYSTEM IN WIRELESS COMMUNICATION SYSTEM USING BEAMFORMING SCHEME

CROSS-REFERENCE TO RELATED APPLICATION(S)

This application is a continuation application of prior application Ser. No. 15/323,853, filed on Jan. 4, 2017, which is a U.S. National Stage application under 35 U.S.C. § 371 of an International application number PCT/KR2015/007184, filed on Jul. 10, 2015 and has issued as U.S. Pat. No. 10,462,680 on Oct. 29, 2019 and was based on and claimed priority under 35 U.S.C § 119(a) of a Korean patent application number 10-2014-0087008, filed on Jul. 10, 2014, in the Korean Intellectual Property Office, the disclosure of which is incorporated by reference herein in its entirety.

TECHNICAL FIELD

The present invention relates to a communication method and apparatus for use in a beamforming-based wireless communication system and, in particular, to a method and system for transmitting beamforming information between a transmitter and a receiver in a beamforming system.

BACKGROUND ART

In order to meet the increasing demand for wireless data traffic since the commercialization of 4G communication systems, the development focus is on the $5^{th}$ Generation (5G) or pre-5G communication system. For this reason, the 5G or pre-5G communication system is called a beyond 4G network communication system or post Long Term Evolution (LTE) system.

In order to accomplish high data rates, consideration is being given to implementing the 5G communication system on the millimeter Wave (mm Wave) band (e.g., 60 GHz band). In order to mitigate propagation loss and increase propagation distance, the 5G communication system is likely to accommodate various techniques such as beamforming, massive MIMO, Full Dimensional MIMO (FD-MIMO), array antenna, analog beamforming, and large scale antenna.

Also, for throughput enhancement of the 5G communication system, research is being conducted on various techniques such as small cell, advanced small cell, cloud radio access network (cloud RAN), ultra-dense network, Device to Device (D2D) Communication, wireless backhaul, moving network, cooperative communication, Coordinated Multi-Points (CoMP), and interference cancellation.

Furthermore, the ongoing research includes the use of Hybrid FSK and QAM modulation and Sliding Window Superposition Coding (SWSC) as Advanced Coding Modulation (ACM), Filter Bank Multi Carrier (FBMC), Non-Orthogonal Multiple Access (NOMA), and Sparse Code Multiple Access (SCMA).

With the advent of the information age, information processing technology has been advancing to handle the explosively growing amounts of information in various fields. Recently, required data processing capability has been increasing more rapidly than in the past. The increase in quantity and quality of information contributes to the growth of data traffic demand in a wireless communication system. In order to meet such demand, the wireless communication system is advancing to support higher data rates.

The $4^{th}$ Generation (4G) wireless communication systems, which have just started being commercialized, aim at improving spectral efficiency to increase data rate. However, it is difficult to expect that it will be possible to meet the explosively growing demand for wireless data traffic with spectral efficiency enhancement technology.

In order to overcome this problem, the use of a very broad frequency band can be considered. However, the current cellular mobile communication systems operate below 10 GHz, which makes it difficult to secure broad frequency bandwidth. Although there is a need to secure a broad frequency band in a higher frequency band, this would not solve all of the problems because the propagation loss becomes higher as the frequency becomes higher.

Using a high frequency band is advantageous in terms of securing a broad frequency bandwidth, but it has a drawback in that the propagation distance is shortened, which results in a reduction of coverage. Thus there is a need to resolve this problem of coverage reduction caused by shortened propagation distance.

Beamforming technology is a method for mitigating against the increased propagation loss stemming from the use of a high frequency band and protecting against reduction of the coverage area. Beamforming techniques can be categorized into two types: transmit beamforming technique performed by a transmitter and receive beamforming technique performed by a receiver.

For such transmit and receive beamforming techniques, a plurality of antennas is arranged in an array, and the antennas included in the antenna array are called array elements. The antennas may be arranged in various types of arrays such as a linear array and a planar array.

Transmit beamforming is a technique for increasing directivity by focusing the signals in a specific direction using the plural antennas. Using the transmit beamforming technique, it is possible to increase the signal directivity and thus increase the propagation distance. Furthermore, because there is almost no radiation of the signals in directions other than the focused direction, it is possible to reduce signal interference for the view of the receiver.

Receiving beamforming is a technique to form the receive signals into a beam using a receive antenna array. The receive beamforming technique is capable of increasing the signal reception sensitivity by focusing reception of the signals in a specific direction. It may also be possible to exclude signals arriving in directions other than the corresponding direction. Accordingly, the receiver is capable of increasing the directivity gain and canceling interference of signals received from other directions.

DISCLOSURE OF INVENTION

Technical Problem

In the case of using the above-described beamforming techniques, the transmitter and the receiver have to share beamforming information to communicate traffic. If the transmit beamforming direction of the transmitter and the receive beamforming direction of the receiver differ from each other, the transmitter and the receiver cannot perform data communication or may determine that the channel condition is very bad. There is therefore a need of sharing the beamforming information between the devices performing the transmit beamforming and/or receive beamforming to enable them to communicate traffic efficiently.

The present invention provides a method and apparatus for sharing the beamforming information between a transmitter and a receiver.

Also, the present invention provides a method and apparatus for minimizing beamforming errors between a transmitter and a receiver.

Solution to Problem

In accordance with an aspect of the present invention, a communication method of a transmitter in a wireless communication system supporting beamforming-based radio communication includes transmitting beam identifiers designated for all directions available for transmission beamforming and a reference signal; determining, when the beam identifiers and error detection information are received from a receiver, whether an error is detected by checking the error detection information; transmitting an acknowledgement signal to a receiver depending on a determination result; and communicating, when no error is detected as a result of checking the error detection information, data based on the received beam information.

In accordance with another aspect of the present invention, a communication method of a receiver in a wireless communication system supporting beamforming-based radio communication includes checking the quality of a reference signal received in all available reception beam directions, selecting a beam direction having the best quality for communication among the reception beam directions, transmitting to a transmitter a feedback signal including a transmission beam identifier of the selected beam direction and information for error detection, and determining a beam direction for communication based on an acknowledgement signal received from the transmitter.

Advantageous Effects of Invention

The beamforming apparatus and method of the present invention is advantageous in terms of allowing the devices performing the transmit beamforming and/or the receive beamforming to communicate traffic efficiently and to minimize beamforming errors by sharing beamforming information.

MODE FOR THE INVENTION

Exemplary embodiments of the present invention are described in detail with reference to the accompanying drawings. The same reference numbers are used throughout the drawings to refer to the same or like parts. The drawings are provided to help in understanding the present invention, but they are not intended to limit the present invention in shape and arrangement. Detailed descriptions of well-known functions and structures incorporated herein may be omitted to avoid obscuring the subject matter of the present invention. In the following, descriptions are made of only the parts necessary for understanding the operations in accordance with various embodiments of the present invention, and descriptions are not made of other parts to avoid obscuring the subject matter of the present invention.

Figure 1:
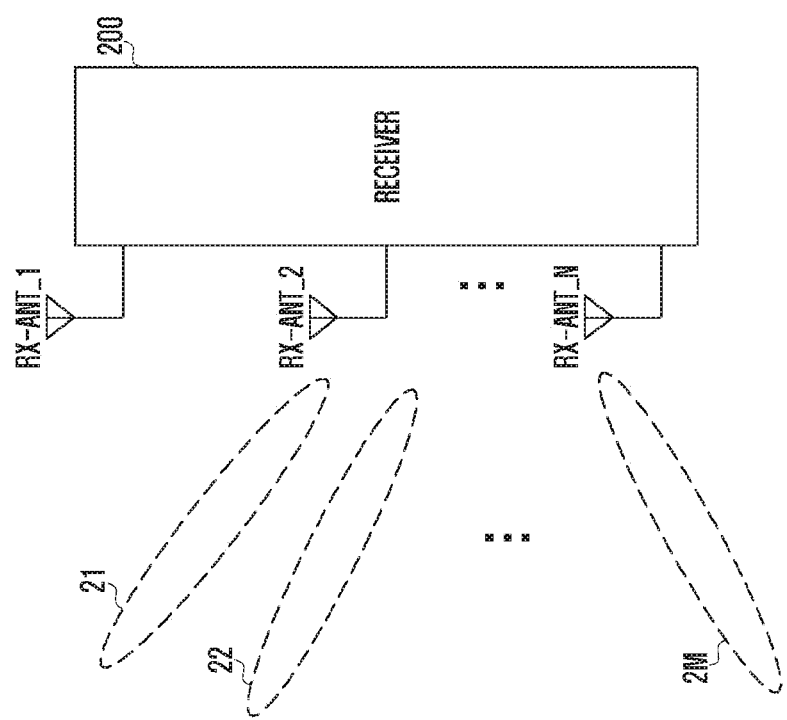
FIG. 1 is a conceptual view illustrating a concept of beamforming in a wireless communication system to which the present invention is applied.
Figure 1:
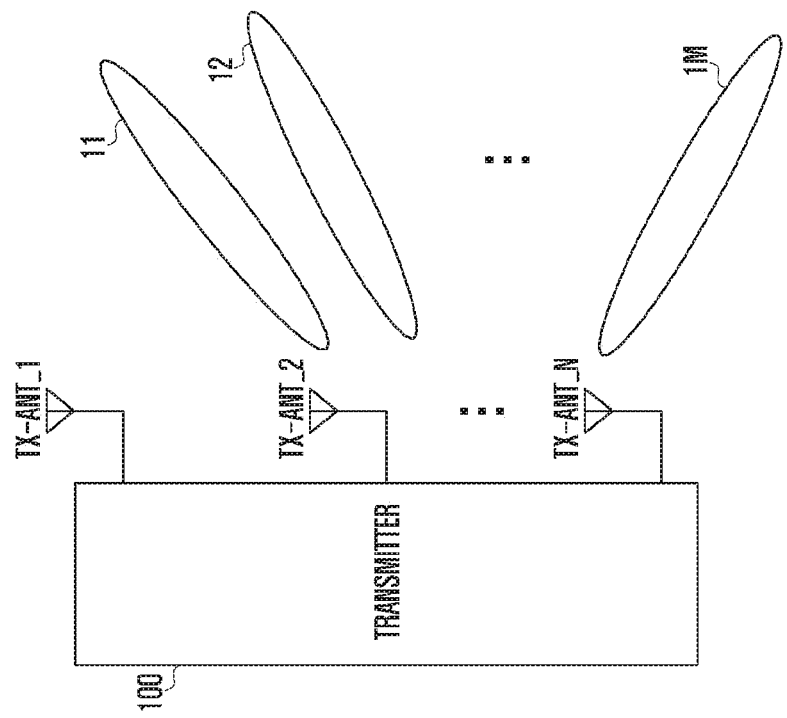

FIG. 1 is a conceptual view illustrating a concept of beamforming in a wireless communication system to which the present invention is applied.

In reference to FIG. 1, a transmitter 100 and a receiver 110 may communicate data and/or signals through a predetermined radio channel. Although the transmitter 100 and the receiver 110 are designated as such for convenience of explanation, both of them can transmit and receive signals. For example, although the transmitter 100 is depicted as a transmission party for transmitting data or signals to the receiver 110, it may also operate as a reception party for receiving data and signals transmitted by the receiver 110. This means that the receiver 110 may also operate in the same way. For example, although the receiver 110 is depicted as a reception party for receiving data and signals transmitted by the transmitter 100, it may also operate as a transmission party for transmitting data and signals to the transmitter 100.

According to an embodiment of the present invention, the transmitter 100 and the receiver 110 are electronic devices having a plurality of antennas for beamforming. For example, the transmitter 100 includes a first transmit antenna (TX_ANT_1), a second transmit antenna (TX_ANT_2), . . . , and an $N^{th}$ transmit antenna (TX_ANT_N). Also, the receiver includes a first receive antenna (RX_ANT_1), a second receive antenna (RX_ANT_2), . . . , an $N^{th}$ receive antenna (RX_ANT_N). In the case that the transmitter and the receiver communicate through a radio channel, the transmitter and receiver may have the same number of antennas and, if the numbers of the antennas do not match, e.g., if the number of antennas of the transmitter 100 is Nt and the number of antennas of the receiver 110 is Nr, the maximum number of streams that the transmitter 100 can transmit simultaneously is limited to the least one of Nt and Nr. In the following, the description is made under the assumption that the transmitter 100 ad the receiver 110 have the same number of antennas for convenience of explanation.

In reference to FIG. 1, the transmitter 100 transmits beams in diverse directions 11, 12, . . . , 1M. Also, the receiver 110 may receive beams in diverse directions 21, 22, . . . , 2M. FIG. 1 exemplifies a case where the number of beam directions available for the transmitter 100 is identical with the number of beam directions available for the receiver 110.

In the embodiment of FIG. 1, one transmitter and one receiver are depicted to describe a situation of communication between one transmitter and one receiver. However, it is obvious that the present invention can be applied to a situation of 1:N communication between a base station and mobile stations using a multiple access scheme.

Figure 2:
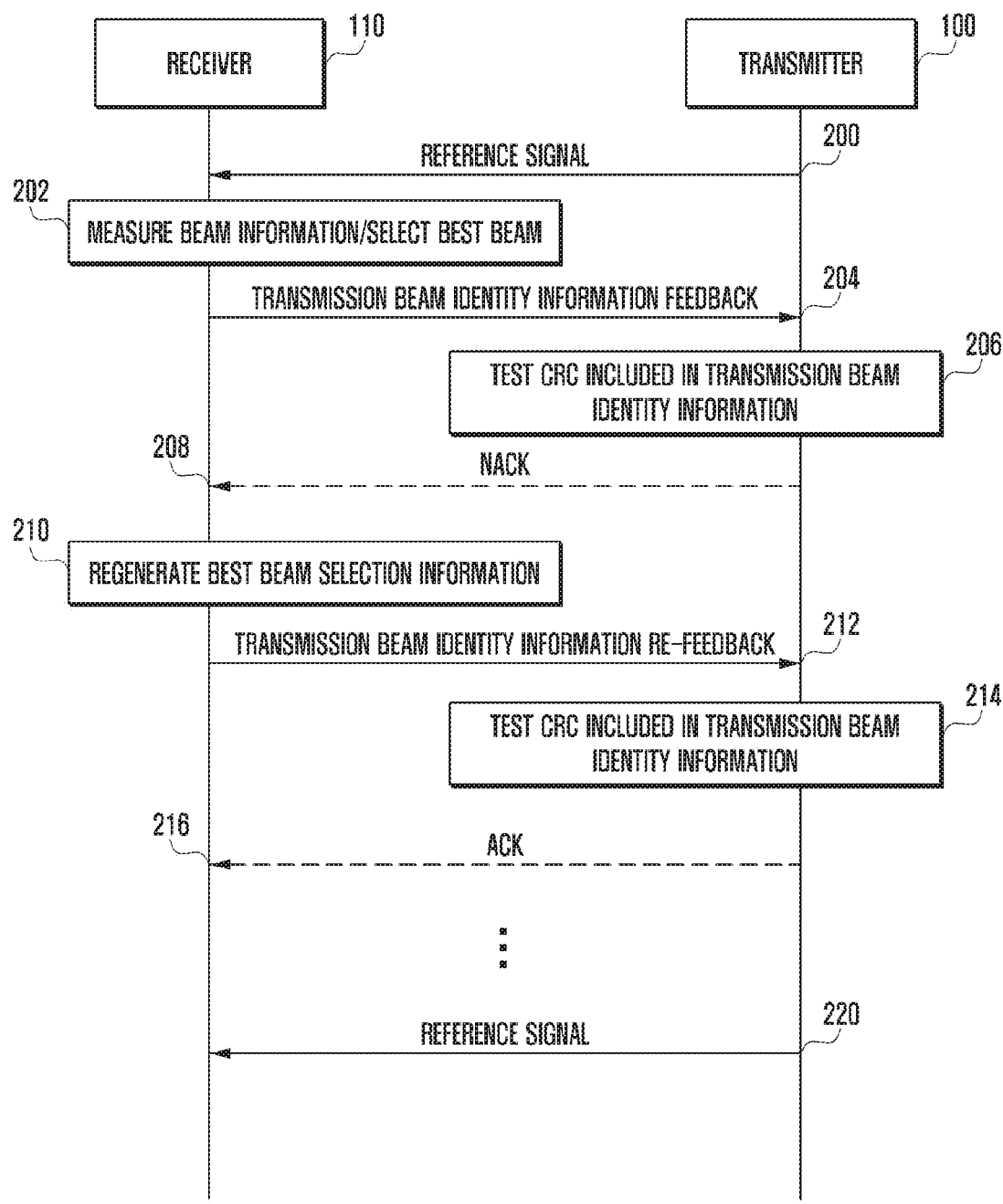
FIG. 2 is a signal flow diagram illustrating a procedure of sharing beamforming information between a transmitter and a receiver according to an embodiment of the present invention.

FIG. 2 is a signal flow diagram illustrating a procedure of sharing beamforming information between a transmitter and a receiver according to an embodiment of the present invention.

The transceiver 100 generates and transmits a reference signal at step 200. The reference signal generated by the transmitter 100 may be a signal known to both the transmitter 100 and the receiver 110. According to an embodiment of the present invention, the transmitter 100 may transmit the reference signal in all possible directions, e.g., M directions in FIG. 1, at step 200. At this time, the transmitter 100 may transmit beamforming direction identity information (or identifiers) along with the beamformed reference signal. In the case that the transmitter 100 is capable of forming the beams in M directions, the beamforming direction identity information has to be able to indicate M directions. The transmitter 100 may also transmit beamformed signals including the reference signal and the beam direction identity information in respective directions.

If the reference signal including identity information is transmitted in this way, the receiver 110 may measure the beams transmitted by the transmitter 110 and select a best beam at step 202. As exemplified above, if the transmitter 100 performs beamforming in M directions, the receiver may perform the receive beamforming to receive a beam having the best signal quality that is achieved by beamforming a predetermined transmission beam in a predetermined reception beam direction. At this time, the receiver 110 may perform the receive beamforming in multiple directions to receive the signal beamformed by the transmitter in multiple directions. Accordingly, the receiver 110 may determine the qualities of the transmission beams received as being receive-beamformed. The receiver may use one or both of the Signal-to-Interference plus Noise Ratio (SINR) or Received Signal Strength Indicator (RSSI) to select the best beam.

If the best beam is selected in association with the transmission and reception beams, the receiver 110 may transmit to the transmitter 100 a feedback including a transmission beam identity information or a transmission beam identity information and a reception beam information at step 204. At this time, the receiver 110 may transmit the transmission beam identity information with a code for detecting an error of the transmission beam identity information, e.g. CRC code. The CRC code can be used in the case where the transmission beam identity information is transmitted in the form of a message. It may also be possible to make a feedback of the transmission beam identity information in the form of a sequence other than a message. In the case of making a feedback of the transmission beam identity information in the form of a sequence other than a message, the error detection may be performed with a threshold-based scheme.

The transmitter 100 may receive the feedback signal including the transmission beam identity information from the receiver 110 at step 204, and the transmitter 100 checks the CRC code included in the transmission beam identity information at step 206. If a CRC error is detected, the transmitter 100 may generate and transmit a negative acknowledgement (NACK) signal to the receiver 110. Otherwise, if no CRC error is detected, the transmitter 100 may generate and transmit an acknowledgement (ACK) signal to the receiver 110.

Although the transmitter 100 may transmit the NACK or ACK signal according to the CRC result, the transmitter 100 may be configured to perform an operation for transmitting only the NACK signal. For example, the transmitter 100 may be configured not to transmit the ACK signal even when no CRC code error is detected in the transmission beam identity information received from the receiver 110. That is, the transmitter may be configured to transmit only the NACK signal when a CRC code error is detected in the transmission beam identity information received from the receiver 110. In this way, the present invention may be applied to a system using the both the NACK and ACK or a system using only the NACK. In an embodiment, it may also be possible to use only the ACK signal rather than the NACK signal.

The embodiment of FIG. 2 is directed to the case where both the NACK and ACK are used for convenience of explanation.

If a CRC code error is detected at step 206, the transmitter 100 transmits a NACK signal to the receiver 110 at step 208. Upon receipt of the NACK signal, the receiver regenerates best beam selection information at step 210 and feeds back the transmission beam identity information again at step 212. Here, the receiver 110 may be configured to omit step 210. This is the case where the information on the formed beam generated at step 202 is stored in a predetermined time buffer. In this case, the receiver 110 may omit step 210 and retransmit the signal stored in the buffer immediately. The predetermined time may be longer than the time for receiving the NACK transmitted by the transmitter 100.

If the receiver 110 retransmits the transmission beam identity information at step 212, the receiver 100 may receive the information and check the CRC code included in the transmission beam identity information at step 214. If no error is detected in the transmission beam identity information at step 214, the transmitter 100 may transmit an ACK signal to the receiver 110 at step 216.

The above description has been made under the assumption that the transmitter 100 transmits the reference signal at a predetermined interval. Accordingly, the receiver 110 has to measure the reference signal beamformed and transmitted by the transmitter 100 in various directions at the predetermined interval and perform feedback corresponding thereto. That is, the transmitter 100 may perform the reference signal transmission operation of step 220, in the same manner as the operation of step 200, at a predetermined time interval. After selecting the transmission beamforming and reception beamforming schemes using the reference signal, the transmitter 100 and the receiver 110 may communicate data traffic based on the beamforming information agreed therebetween.

According to an embodiment of the present invention, steps 210 to 216 may be omitted. For example, in the case that the transmission interval of the reference signal transmitted from the transmitter 100 to the receiver 110 is very short, it may be possible to configure the procedure without steps 210 to 216. This configuration may be applied to the case of using both the NACK and ACK signals as well as the case of using only the NACK of step 208.

According to an embodiment of the present invention, the number of times to perform steps 210 to 122 may be limited to 2 or 3. If a CRC code error is detected at the transmitter even when the receiver 110 retransmits the signal two or three times, this may cause unnecessary waste of system resources. For other reasons, the number of retransmissions of the transmitter 100 may be limited when the next reference signal transmission timing draws near.

According to an embodiment of the present invention, if a PDCCH is successfully received through the transmission beams selected in the $N^{th}$ transmission/reception beam selection process before a predetermined time period and transmitted to the transmitter 100, the receiver (terminal) 110 assumes that the beam information transmitted to the transmitter (base station) 100 in the $N^{th}$ transmission/reception beam selection process is successfully received by the transmitter 100. However, this case can be applied to the case where the transmission beam information updated successfully between the transmitter 100 and the receiver 110 at the most recently previous timing and the transmission beam information transmitted in the $N^{th}$ transmission/reception beam selection process are different from each other.

In the case that the transmitter 100 and the receiver 110 share only the transmission beamforming identity information or both the transmission beamforming identity information and the reception beamforming identifier, the receiver 110 is capable of receiving data more efficiently. As a consequence, this make it possible to improve the efficiency and reliability of the wireless communication system.

The above proposed method can be applied to various wireless communication systems supporting a beamforming technique such as a mobile communication system and a WiFi system. The above-described methods may be exemplified hereinafter under the assumptions as follows: the receiver 110 is a terminal of a wireless communication system and the transmitter 100 is a base station of the wireless communication system.

Then the terminal 100 use a transmission beam, which is predetermined between the base station and the terminal, to transmit an uplink control channel (e.g., PUCCH). For example, the receiver (terminal) 110 transmits the uplink control channel using the best uplink transmission beam indicated successfully by the transmitter (base station) 100 at the most recently previous timing, and the transmitter (base station) 100 receives the uplink control channel using the best reception beam corresponding to the transmission beam.

In the case where the transmitter (base station) 100 is not transmitting the transmission beam information explicitly in resource allocation, it may be possible for the transmitter (base station) 100 and the receiver (terminal) 110 to assume a transmission beam predetermined therebetween. In order to accomplish the operation scenario without any error, the terminal-measured best downlink beam information or the base station-measured best uplink beam information should be delivered to the base station or the terminal without any error such that the base station and the terminal share the identical beam information.

Although the above description is directed to the operational scenario concerning control channels, the present invention can be applied to the operation concerning data channels for reliable communication by matching the beam information of the base station and the terminal.

In order to minimize any beam information mismatch between the base station and the terminal, the retransmission procedure may be performed by checking the CRC code in case of using the aforementioned messages or on the basis of a threshold value in case of using a sequence. Since the feedback procedure for uplink transmission beam is identical with that for the downlink beam information, the description is directed to the feedback procedure for the downlink transmission beam. If there is reciprocity between the uplink and downlink channels, one of the feedback procedures for the downlink and uplink transmission beams is omitted.

The receiver (terminal) 110 may select a predetermined number of downlink beams based on the reference signals transmitted by the transmitter (base station) 100 and may transmit to the base station a feedback information on the selected beam in uplink. Here, the number of downlink beams may be one or more and informed by the base station or fixed to a certain value. The downlink beam selection is made based on the signal strength or Signal-to-Interference and Noise Radio (SINR), and the selected downlink beam may be the best beam selected based on the aforementioned criteria. As described above, the selected downlink beam may be an identifier or an index for identifying the downlink beam.

As described above, because a CRC code is attached to the beam information fed back by the receiver (terminal) 110, the transmitter (base station) 100 checks whether the beam information transmitted by the terminal is received without any error through a CRC check. In an embodiment, the beam information transmitted by the receiver (terminal) 110 has no CRC code, and the transmitter (base station) 100 may determine error probability of the beam information fed back by the receiver (terminal) 110 using an implementation algorithm. Typically, the use of CRC contributes to higher error detection reliability.

After performing error detection on the beamforming information fed back by the receiver (terminal) 110, the base station may send the terminal the information on whether an error has been detected using two methods as follows. The first method is performed using the ACK/NACK signal. If the beam information fed back by the receiver (terminal) 110 is received with any error, the transmitter (base station) 100 may send the receiver (terminal) 110 the ACK signal. Otherwise, if the beam information fed back by the receiver (terminal) 110 is received with an error, the transmitter (base station) 100 may transmit the NACK signal. The second method is a NACK signal-only based method in which the transmitter (base station) 100 requests to the receiver (terminal) 100 for retransmission only when the beam information feedback by the receiver (terminal) 110 is received with an error. It is difficult to apply the second method to the uplink transmission beam feedback procedure.

In the first method, the terminal retransmits the beam information through a predefined retransmission procedure upon receipt of the NACK signal. The retransmission procedure may be configured variously so as to be performed in a synchronous/asynchronous HARQ mode depending on whether the retransmission timing is fixed and in an adaptive/non-adaptive HARQ mode depending on whether the resource position and size is variable. In the second method, the terminal retransmits the beamforming upon receipt of a retransmission request in consideration of the content of the request from the base station.

The base station and terminal update the beam information simultaneously in view of the ACK signal reception timing in the first method and in view of a timing predetermined for receiving the retransmission request in the second method.

Afterward, the base station continues transmitting the reference signal, and the terminal performs measurement for collecting the beam information. The terminal transmits the beam information periodically or aperiodically in response to a request from the base station or in an event-trigger manner.

Next, the transmitter 100 may use the beamforming method for transmitting the ACK and/or NACK signals to the receiver 110. In this case, the interference caused by the acknowledgement signals transmitted/received between the transmitter 100 and the receiver 110 may decrease dramatically from the view point of total throughput of the radio communication system. If the beamforming method is used for transmitting the acknowledgement signal, this may increase the probability of failed receipt of the ACK/NACK signals. This is because the misalignment of the transmission and reception beams of the ACK/NACK signals makes it difficult to receive the ACK/NACK signals normally. Hereinafter, a description is made of the method for reducing transmission errors of beamformed ACK/NACK signals according to an embodiment of the present invention.

Figure 3:
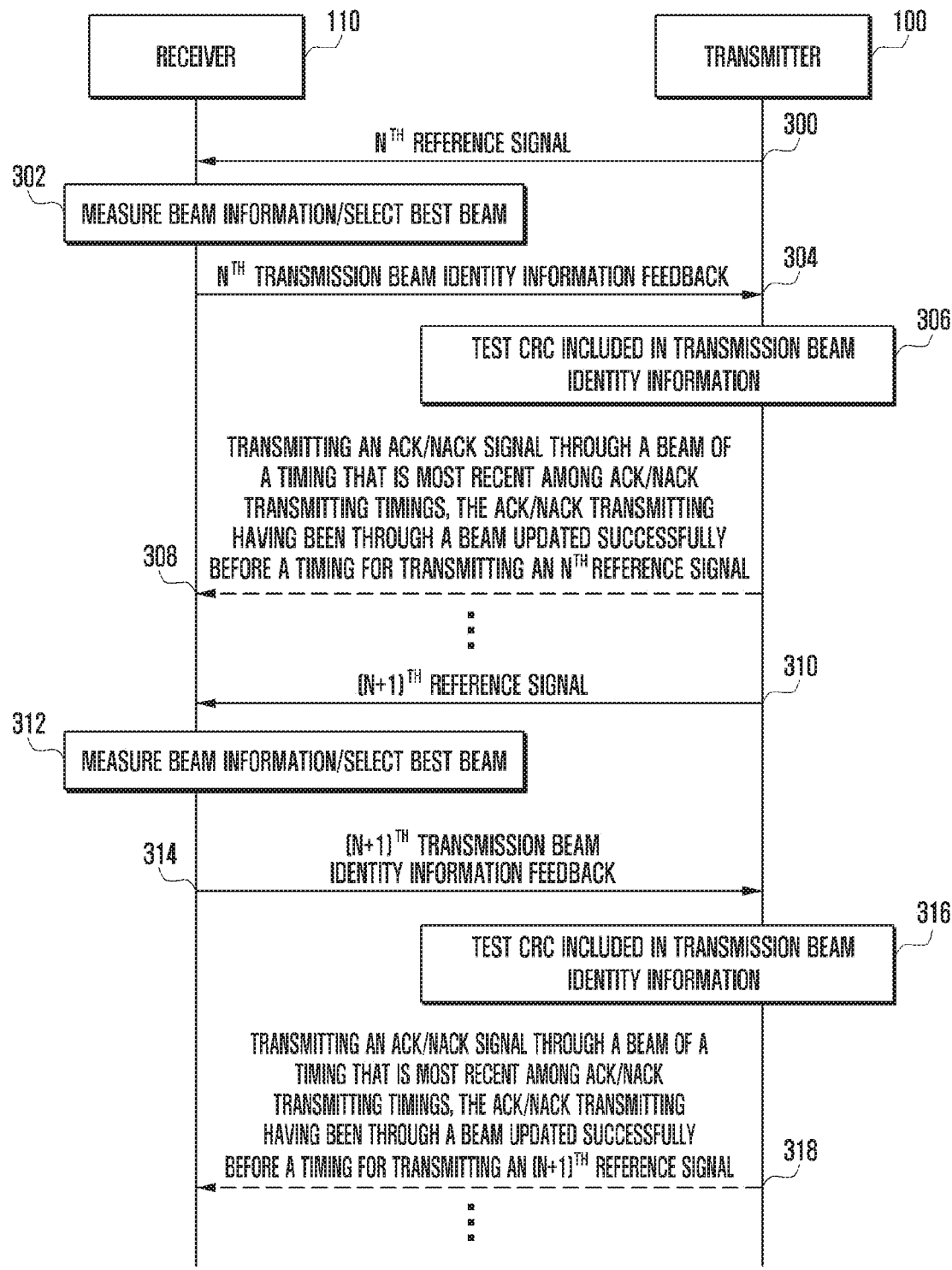
FIG. 3 is a signal flow diagram illustrating an acknowledgement signal transmission procedure between a transmitter and a receiver according to an embodiment of the present invention.

FIG. 3 is a signal flow diagram illustrating an acknowledgement signal transmission procedure between a transmitter and a receiver according to an embodiment of the present invention.

In reference to FIG. 3, the transmitter 100 generates and transmits a reference signal at step 300. The reference signal generated by the transmitter 100 may be the signal known to both the transmitter 100 and the receiver 110 as described above. According to an embodiment of the present invention, the transmitter 100 may transmit the reference signal at step 300 in all possible directions, e.g., M directions in FIG. 1. At this time, the transmitter 100 may transmit the transmission beams including respective identity information. If the transmitter 100 is capable of forming the beams in M directions, it may assign the respective identity information to beams 1 to M.

If the reference signals including the transmission beam-specific identity information are transmitted, the receiver 110 may measure the beams transmitted by the transmitter 100 and select the best beam at step 302. As exemplified above, if the transmitter 100 performs beamforming in M directions, the receiver may perform the receive beamforming to receive a beam having the best signal quality that is achieved by forming a predetermined transmission beam in a predetermined reception beam direction. At this time, the receiver 110 may perform the receive beamforming in multiple directions to receive the signal beamformed by the transmitter in multiple directions. Accordingly, the receiver 110 may determine the qualities of the transmission beams received as being receive-beamformed. The receiver 110 may use one or both of the Signal-to-Interference plus Noise Ratio (SINR) or Received Signal Strength Indicator (RSSI) to select the best beam.

If the best beam is selected in this way, the receiver 110 may transmit to the transmitter 100 a feedback including a transmission beam identity information at step 304. At this time, the receiver 110 may transmit the transmission beam identity information with a code for detecting errors in the transmission beam identity information, e.g. CRC code. As described above, it may also be possible to make a feedback of the transmission beam identity information in the form of a sequence other than a message. In the case of making a feedback of the transmission beam identity information in the form of a sequence other than a message, the error detection may be performed with a threshold-based scheme. In the following description, it is assumed that the transmission beam identity information is transmitted in a message format for convenience of explanation.

Accordingly, the transmitter 100 may receive the feedback information including the transmission beam identity information transmitted by the receiver 110 at step 304 and check the CRC code included in the transmission beam identity information at step 306. If a CRC error is detected in the CRC test, the transmitter 100 may generate and transmit a NACK signal to the receiver 110. If no CRC error is detected in the CRC test, the transmitter may generate and transmit an ACK signal to the receiver 110.

According to an embodiment of the present invention, if a PDCCH is successfully received through the transmission beams selected in the $N^{th}$ transmission/reception beam selection process before a predetermined time period and transmitted to the transmitter 100, the receiver (terminal) 110 assumes that the beam information transmitted to the transmitter (base station) 100 in the $N^{th}$ transmission/reception beam selection process is successfully received by the transmitter 100. However, this case can be applied to the case where the transmission beam information updated successfully between the transmitter 100 and the receiver 110 at the most recently previous timing and the transmission beam information transmitted in the $N^{th}$ transmission/reception beam selection process are different from each other.

In the present invention, the receiver 110 may transmit the ACK/NACK corresponding to the $N^{th}$ reference signal using the transmission beam updated successfully between the transmitter 100 and the receiver 110 at the most recently previous timing.

For example, if the most recently previous successfully updated reference signal transmission timing between the transmitter 100 and the receiver 110 among the timings preceding the $N^{th}$ reference signal transmission timing is successfully updated with the $(N-1)^{th}$ reference signal in transmitting the ACK/NACK signal corresponding to the $N^{th}$ transmitted reference signal, the ACK/NACK signal may be transmitted in the $(N-1)^{th}$ updated beam direction. In another example, if the most recently previous successfully updated reference signal transmission timing between the transmitter 100 and the receiver 110 among the timings preceding the $N^{th}$ reference signal transmission timing is successfully updated with the $(N-2)^{th}$ reference signal, the ACK/ANCK signal may be transmitted in the $(N-2)^{th}$ updated direction. By using the successfully updated beam known to the transmitter 100 and the receiver 110, it is possible to reduce the probability of acknowledgement signal transmission/reception error.

If the number of beams that are successfully updated between the transmitter 100 and the receiver 110 at the most recently previous timing is equal to or more than 2, the transmitter 100 may notify the receiver 110 of a beam to be used for transmitting ACK/NACK.

Even when feeding back the transmission beam identity information at step 304, the above described method can be used identically.

This method may be performed continuously afterward. For example, steps 310 to 318 correspond to the above-described steps 300 to 308. Also, it should be noted that the operation for transmitting or receiving data traffic in the beamforming direction configured between the transmitter and the receiver is omitted in FIG. 3 after the transmission direction is configured.

Figure 4:
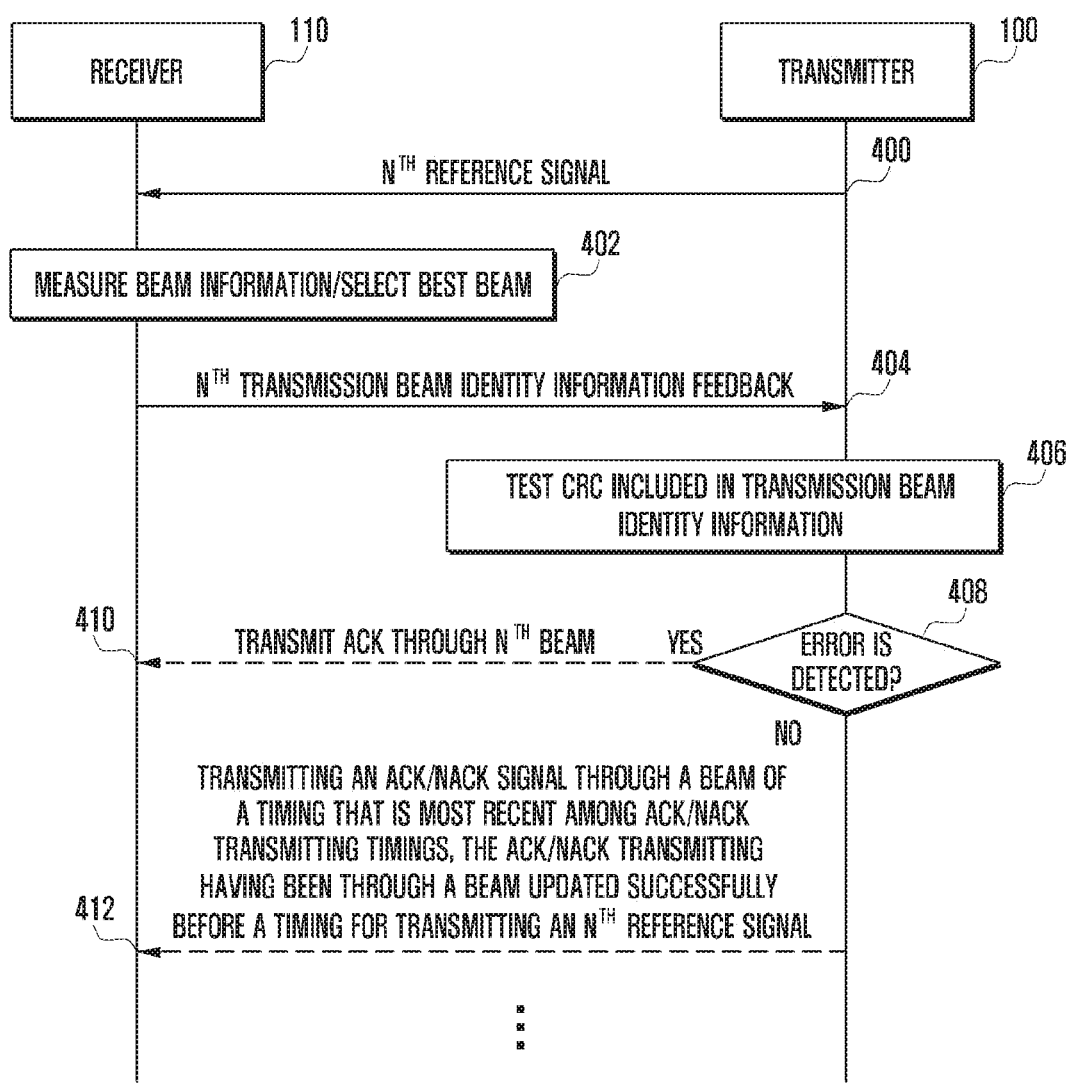
FIG. 4 is a signal flow diagram illustrating an acknowledgement signal transmission procedure between a transmitter and a receiver according to another embodiment of the present invention.

FIG. 4 is a signal flow diagram illustrating an acknowledgement signal transmission procedure between a transmitter and a receiver according to another embodiment of the present invention.

In the signal flow diagram of FIG. 4, the descriptions of the operations identical with or analogous to the above-described operations, e.g. retransmission operation after NACK transmission or data transmission and reception in the configured beamforming direction, are omitted herein.

In reference to FIG. 4, the transmitter 100 generates and transmits a reference signal at step 400. The reference signal generated by the transmitter 100 may be the signal known to both the transmitter 100 and the receiver 110 as described above. According to an embodiment of the present invention, the transmitter 100 may transmit at step 400 the reference signal in all possible directions, e.g., M directions in FIG. 1. At this time, the transmitter 100 may transmit the transmission beams including respective identity information. If the transmitter 100 is capable of forming the beams in M directions, it may assign the respective identity information to the beams 1 to M.

If the reference signals including the transmission beam-specific identity information are transmitted, the receiver 110 may measure the beams transmitted by the transmitter 100 and select the best beam at step 402. As exemplified above, if the transmitter 100 performs beamforming in M directions, the receiver may perform the receive beamforming to receive a beam having the best signal quality that is achieved by forming a predetermined transmission beam in a predetermined reception beam direction. At this time, the receiver 110 may perform the receive beamforming in multiple directions to receive the signal beamformed by the transmitter in multiple directions. Accordingly, the receiver 110 may determine the qualities of the transmission beams received as being receive-beamformed. The receiver 110 may use one or both of the Signal-to-Interference plus Noise Ratio (SINR) or Received Signal Strength Indicator (RSSI) to select the best beam.

If the best beam is selected in this way, the receiver 110 may transmit to the transmitter 100 a feedback including a transmission beam identity information at step 404. At this time, the receiver 110 may transmit the transmission beam identity information with a code for detecting an error of the transmission beam identity information, e.g. CRC code.

In the present invention, the acknowledgement signal may be transmitted using a transmission beam updated successfully between the transmitter 100 and the receiver 110 at the most recently previous of the reception timings before the receipt of the $N^{th}$ reference signal in feeding back the information on the selected beam for the $N^{th}$ reference signal.

As a consequence, the transmitter 100 may acquire the feedback information included in the transmission beam identity information transmitted by the receiver 110 at step 404 and check the CRC code included in the transmission beam identity information at step 406. Next, the transmitter 100 determines whether any error is detected as a result of checking the CRC code at step 408. This may be the case where no error is detected in the data received from the receiver 110. If there is no error, the transmitter 100 may transmit the ACK signal in the beam direction reported by the receiver 110 based on the measurement performed on the $N^{th}$ reference signal. Since this means that the signal is received normally, it may be possible to transmit the ACK signal more efficiently without beamforming in the direction updated successfully at the most recently previous of the timings before the transmission of the Nth reference signal, i.e. the direction which is variable according to the change of the channel condition.

Otherwise, if no error is detected as a result of checking the CRC code at step 408, the transmitter 100 may transmit, at step 412, the NACK signal beamformed in a direction updated successfully at the most recently previous of the timings before the transmission of the $N^{th}$ reference signal. Accordingly, steps 410 and 412 may be the operations being performed optionally. That is, if step 410 is performed, step 412 is omitted; if step 412 is performed, step 410 is omitted.

In order to support the receiver (terminal) 110 having one reception chain in the procedure as described in FIG. 4, it may be possible to use the following method. The transmitter (base station) 100 transmits to the terminal the NACK signal for the case where an error is detected in the beam information fed back by the receiver 110 or the ACK signal for the case where no error is detected. At this time, the ACK signal may be transmitted based on the beam information received without an error at the $N^{th}$ feedback step, and the NACK signal may be transmitted using the transmission beam updated successfully between the transmitter 100 and the receiver 110 at the most recently previous of the timings before the $N^{th}$ reference signal transmission timing. Since the receiver 100 has one reception chain, it receives the ACK/NACK using the best reception beam corresponding to the transmission beam transmitted at the $N^{th}$ feedback timing.

In order to support the receiver 110 having one reception chain, it may be possible to use another method as follows. The transmitter (base station) 100 transmits to the terminal the NACK signal for the case where an error is detected in the beam information fed back by the receiver 110 or the ACK signal for the case where no error is detected. At this time, the ACK signal may be transmitted based on the beam information received without an error at the $N^{th}$ feedback step, and the NACK signal may be transmitted based on the beam information updated successfully at the most recently previous of the timings before the $N^{th}$ timing.

Since the receiver 110 has one reception chain, the transmitter transmits the ACK signal at the $p^{th}$ time duration and the NACK signal at the $q^{th}$ time duration. That is, when the ACK is transmitted in the $p^{th}$ time duration, no signal is transmitted in the $q^{th}$ time duration. Also, when the NACK is transmitted in the $q^{th}$ time duration, no signal is transmitted in the $p^{th}$ time duration. Since the signal transmission resource positions indicate the information on the ACK and NACK, it may be possible to transmit the same signal regardless of time duration (signal transmission resource position). It may also be possible to configure such that the ACK is transmitted in both the $p^{th}$ and $q^{th}$ time durations and the NACK is also transmitted in both the $p^{th}$ and $q^{th}$ time durations.

The above-described method is designed to support the terminal having one reception chain, but it is not limited to the case where the terminal has one reception chain.

A description is further made of the supplementary operations under the assumption that the transmitter 100 is a base station and the receiver 110 is a terminal.

In the embodiments of FIGS. 3 and 4, in the case that the ACK signal transmitted by the base station is misinterpreted as a NACK signal, if no beam information retransmission command is received from the base station before a predetermined time or at a predetermined timing, the UE may determine that there is an error in the NACK signal and correct the NACK signal into the ACK signal.

In the case that the base station transmits the beam information to the terminal, if the ACK signal transmitted by the terminal is received erroneously so as to be misinterpreted as a NACK, the base station retransmits the beam information to the terminal.

If the NACK signal transmitted by the base station is received erroneously so as to be interpreted as the ACK signal, the base station requests to the terminal for retransmission of the beam information. Since the retransmission request is transmitted based on the transmission beam information received successfully by the base station at the most recently previous timing, it is preferable for the UE to receive it using the best reception beam corresponding to the transmission beam. Accordingly, when the ACK is detected, the UE may update the beam information after a predetermined time period other than immediately. The time period should be set to a length longer than the time duration required for making a retransmission request to the terminal.

In contrast, if the NACK signal transmitted by the terminal is received erroneously so as to be interpreted as the ACK and if the base station does not retransmit the beam information in a predetermined time, the terminal may determine that the base station has received the NACK signal erroneously and thus request to the base station for retransmission of the beam information using a beam information retransmission request message/channel.

Figure 5:
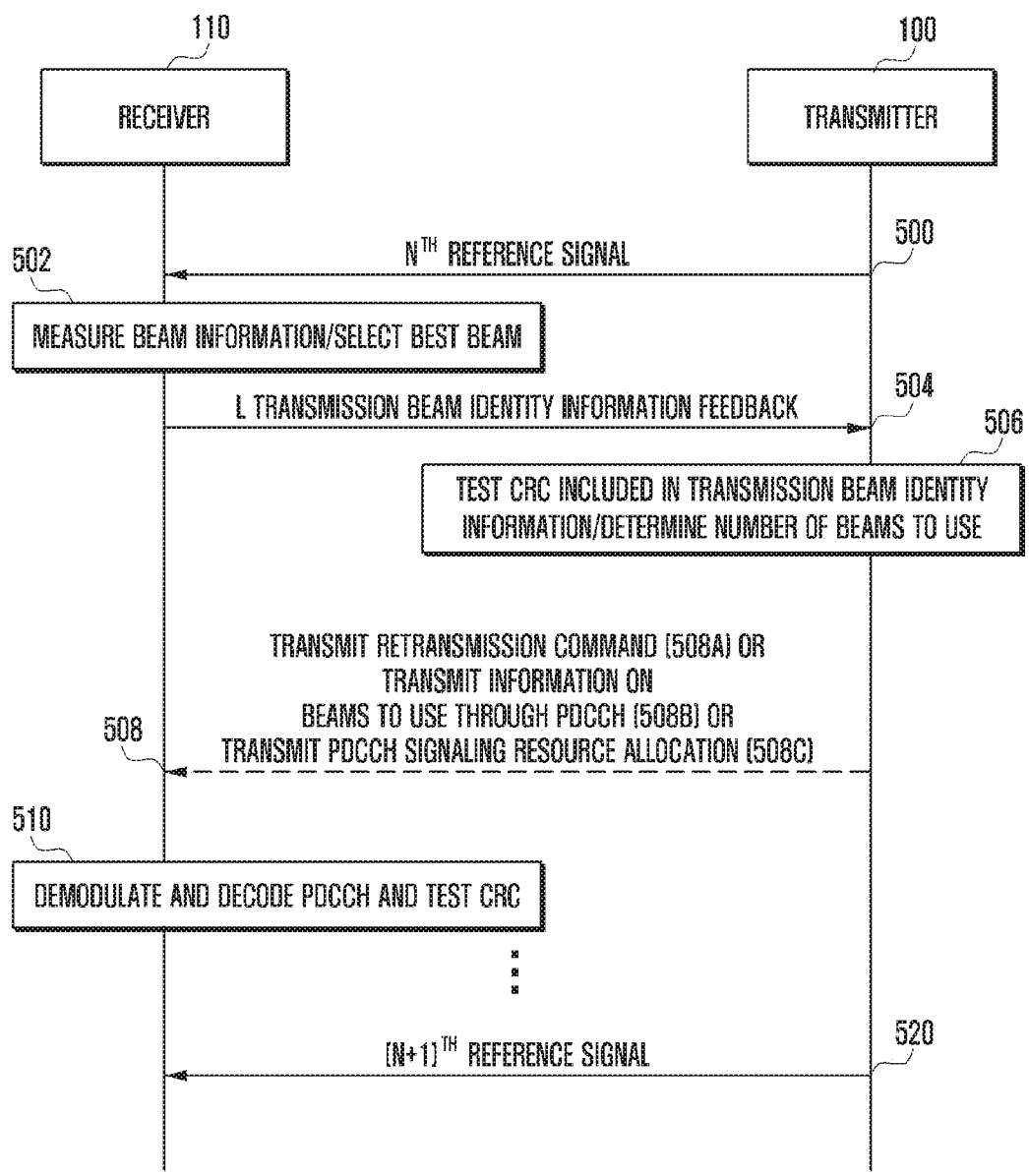
FIG. 5 is a signal flow diagram illustrating an acknowledgement signal transmission procedure between a transmitter and a receiver according to another embodiment of the present invention.

FIG. 5 is a signal flow diagram illustrating an acknowledgement signal transmission procedure between a transmitter and a receiver according to another embodiment of the present invention.

In reference to FIG. 5, the transmitter 100 generates and transmits a reference signal at step 500. The reference signal generated by the transmitter 100 may be the signal known to both the transmitter 100 and the receiver 110 as described above. According to an embodiment of the present invention, the transmitter 100 may transmit at step 500 the reference signal in all possible directions, e.g., M directions in FIG. 1. At this time, the transmitter 100 may transmit the transmission beams including respective identity information. If the transmitter 100 is capable of forming the beams in M directions, it may assign the respective identity information to the beams 1 to M.

If the reference signals including the transmission beam-specific identity information are transmitted, the receiver 110 may measure the beams transmitted by the transmitter 100 and select the best beam at step 502. As exemplified above, if the transmitter 100 performs beamforming in M directions, the receiver may perform the receive beamforming to receive a beam having the best signal quality that is achieved by forming a predetermined transmission beam in a predetermined reception beam direction. At this time, the receiver 110 may perform the receive beamforming in multiple directions to receive the signal beamformed by the transmitter in multiple directions. Accordingly, the receiver 110 may determine the qualities of the transmission beams received as being receive-beamformed. The receiver 110 may use one or both of the Signal-to-Interference plus Noise Ratio (SINR) or Received Signal Strength Indicator (RSSI) to select the best beam.

If reference signals including the transmission beam-specific identity information are received, the receiver may measure the qualities of the transmission beams and select L beams available for use. Next, the receiver 110 generates the information on the L beams available for use, e.g., the information including the beam identifiers and/or qualities of the selected beams, and transmits the generated information as feedback information to the transmitter 100 at step 504. At this time, the receiver 110 may transmit the transmission beam identity information with a code for detecting errors in the transmission beam identity information, e.g. CRC code.

The transmitter 100 may receive the feedback signal transmitted by the receiver 110 at step 504 and check the CRC code included in the transmission beam identity information at step 506. At this time, the feedback information may include the selected beam-specific identifiers and/or selected beam-specific qualities as described above.

If no error is detected as a result of checking the CRC code, the transmitter 100 determines a number of beams to use at step 506. At this time, the number of beams to be used may be determined based on the information of the L beams available for data communication that is transmitted by the receiver 110.

Here, step 508 may be subdivided into three steps 508a, 508b, and 508c.

First, if an error is detected as a result of checking the CRC code at step 506, retransmission may be requested. In this case, the transmitter 100 may request for beam information retransmission using a resource allocation control channel (PDCCH) at step 508a. That is, the retransmission request is transmitted through the PDCCH only when an error is detected and not when no error is detected. At this time, the transmitter 100 may request using the PDCCH at step 508a for the retransmission based on the transmission beam updated successfully between the transmitter 100 and the receiver 110 at the most recently previous timing.

Since the receiver 110 knows that the transmitter 100 transmits the retransmission request through the PDCCH using the transmission beam updated successfully between the transmitter 100 and the receiver 110 at the most recently previous timing, it may monitor the PDCCH for receiving the retransmission request using the reception beam corresponding to the transmission beam.

Accordingly, if the PDCCH is not received successfully in a predetermined time duration or at a predetermined timing, the receiver 110 may assume that the feedback signal corresponding to the selected transmission beams for the Nth received reference signal has been successfully received by the transmitter 100. As an another method, the receiver 110 may monitor the reception beams corresponding to the transmission beams updated successfully between the transmitter 100 and the receiver 110 at the most recently previous timing among the previous timings and the transmission beams transmitted in the $N^{th}$ transmission/reception beam selection process to receive the retransmission request.

Second, a description is made of the case where no error is detected as a result of checking the CRC code at step 506. If no error is detected as a result of checking the CRC code at step 506, this is the case where the transmitter 100 receives L transmission beam identity information through the best beams available for use from the receiver 100 at step 504. At this time, the transmitter 100 may use all or part of the L transmission beams selected by the receiver 110. Accordingly, the transmitter 100 may transmit to the receiver 110 the information on the S beams that is equal, in number, to or less than L transmission beam identifiers to be used by the transmitter 100 among the L transmission beam identifiers fed back by the receiver 110 through the PDCCH at step 508b. At this time, S may be 1 or an integer greater than 1.

In this case, the data transmitted through the PDCCH may include a CRC code for detecting errors in the transmitted information. The receiver 110 may perform demodulation and decoding on the PDCCH and determine whether an error is detected in the received data through a CRC test at step 510. If the receiver 110 performs error detection at step 510, this is the case where the PDCCH is received with a beam selected in the $N^{th}$ transmission/reception beam selection process. Accordingly, if no error is detected as a result of CRC test on the received PDCCH, the receiver 110 may assume that the feedback of the transmission beams selected in the $N^{th}$ reference signal has successfully been received.

Third, a description is made of another case where no error is detected as a result of checking the CRC code at step 506. If no error is detected as a result of the CRC test at step 506, this is the case where the receiver 110 has notified the transmitter 100 of the best beams selected in the $N^{th}$ transmission/reception beam selection process before a predetermined time point. In this case, the transmitter 100 acquires the information on the best beams received at step 506 and, if any error is detected as a result of the CRC test, transmits the PDCCH signaling normal resource allocation at step 508c. This is the case where the receiver 110 receives the PDCCH successfully through the transmission beams transmitted by the transmitter 100. If the PDCCH signaling the normal resource allocation is received in this way, the receiver (terminal) 110 assumes that the beam information transmitted to the transmitter (base station) 100 in the Nth transmission/reception beam selection process is received successfully by the transmitter 100. However, this case may be applied to the case where the transmission beam information updated successfully between the transmitter 100 and receiver 110 at the most recently previous of the previous timings and the transmission beam information transmitted in the N'h transmission/reception beam selection process are different from each other.

Afterward the reference signal is transmitted again at step 520 after being transmitted at step 500, and packet data transmission and reception may be performed in the configured beam direction after step 512.

Figure 6:
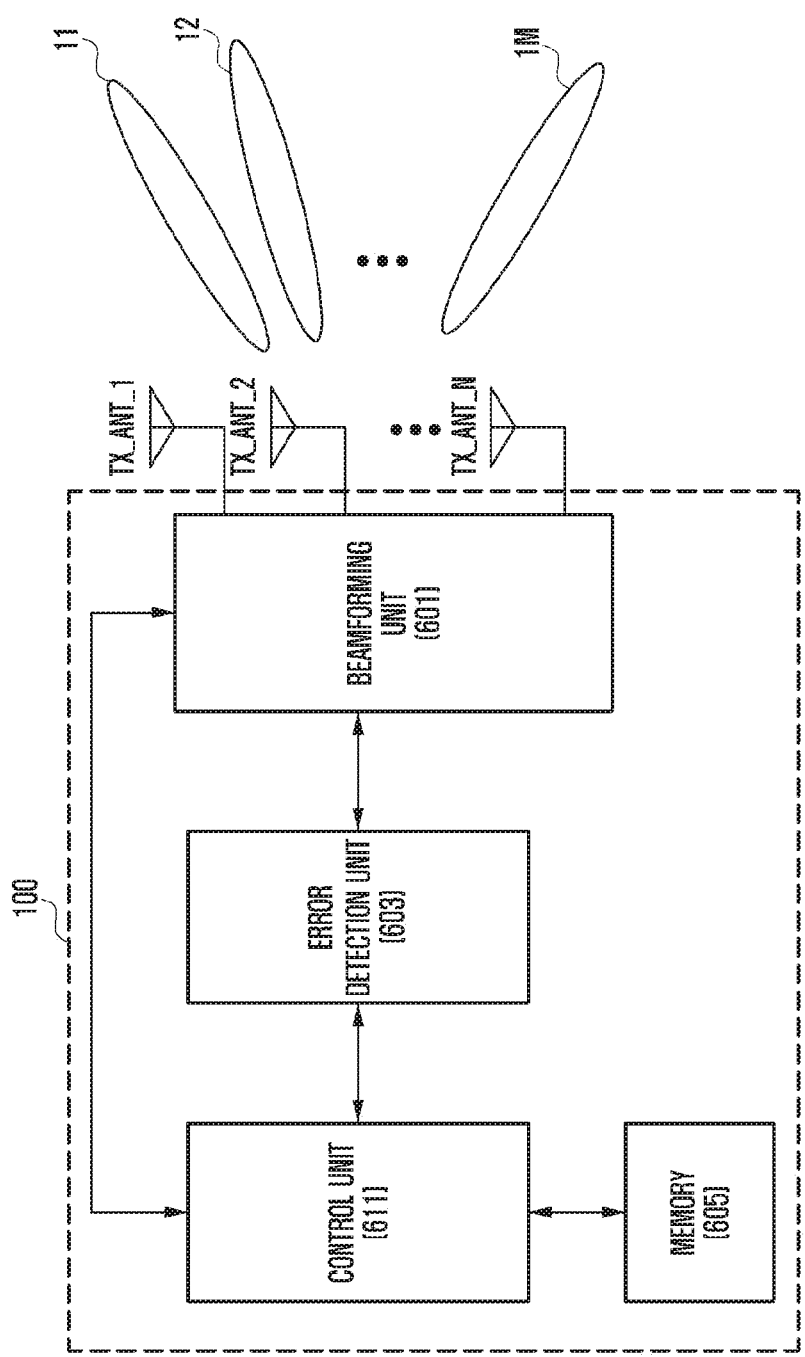
FIG. 6 is a block diagram illustrating a configuration of a transmitter according to an embodiment of the present invention.

FIG. 6 is a block diagram illustrating a configuration of a transmitter according to an embodiment of the present invention.

In reference to FIG. 6, the transmitter 100 may include a beamforming unit 601, an error detection unit 603, a memory 605, and a control unit 611. A plurality of antennas TX_ANT_1, TX_ANT_2, . . . , TX_ANT_N may be connected to the beamforming unit 601.

The beamforming unit 601 may multiply beamforming factors to the reference signals and output the multiplication results to the corresponding antennas TX_ANT_1, TX_ANT_2, . . . , TX_ANT_N. As a consequence, beamforming is performed in various directions by means of the antennas TX_ANT_1, TX_ANT_2, . . . , TX_ANT_N. The beamforming unit 601 may include a radio processing unit for up-converting a baseband signal to a radio signal and down-converting the received signals as beamformed by the TX_ANT_1, TX_ANT_2, . . . , TX_ANT_N to base band signals. The beamforming unit 601 may form one or more beams to receive the data conveyed by one or more transmission beams under the control of the control unit 611. The beamforming unit 601 may form a reception beam in a specific direction to receive the transmission beam formed in a specific direction under the control of the control unit 611.

The beamforming unit 601 inputs the signal received through beamforming to the error detection unit 603. The error detection unit 603 may check whether any error is detected in the data received through transmission/reception beamforming under the control of the control unit 611. The data error check may be the CRC check as described above. The error detection unit 603 may provide the control unit 611 with the error checking result information and/or the information received through the transmission/reception beam. For example, when no error is detected, the error detection unit 603 may send the control unit 611 the information indicating no error or a no error indicator and the information received through transmission/reception beamforming, e.g., identity information of a specific transmission beam. If an error is detected in the received information, the error detection unit 603 may send the control unit 611 the error detection notification information or indicator.

The control unit 611 may control the beamforming unit 601 to perform the transmission beamforming and reception forming. The beamforming may be performed according to the methods described above with reference to FIGS. 1 to 5. If the transmission beam identity information is received without any error from the receiver 110 after transmitting the $N^{th}$ reference signal, the control unit may control the transmitter to store the received identity information in the memory 605.

The memory 605 may include a region for storing the information necessary for controlling overall operations of the transmitter 100, data generated during the control, the transmission beam identity information, and the transmission beam identifier history information under the control of the control unit 611. For example, the memory unit 605 may store the information on the transmission beam information updated successfully between the transmitter 100 and the receiver 110 at the most recently previous timing.

The control unit 611 may configure the best beam based on the information stored in the memory 605 according to the methods described with reference to FIGS. 2 to 5.

Figure 7:
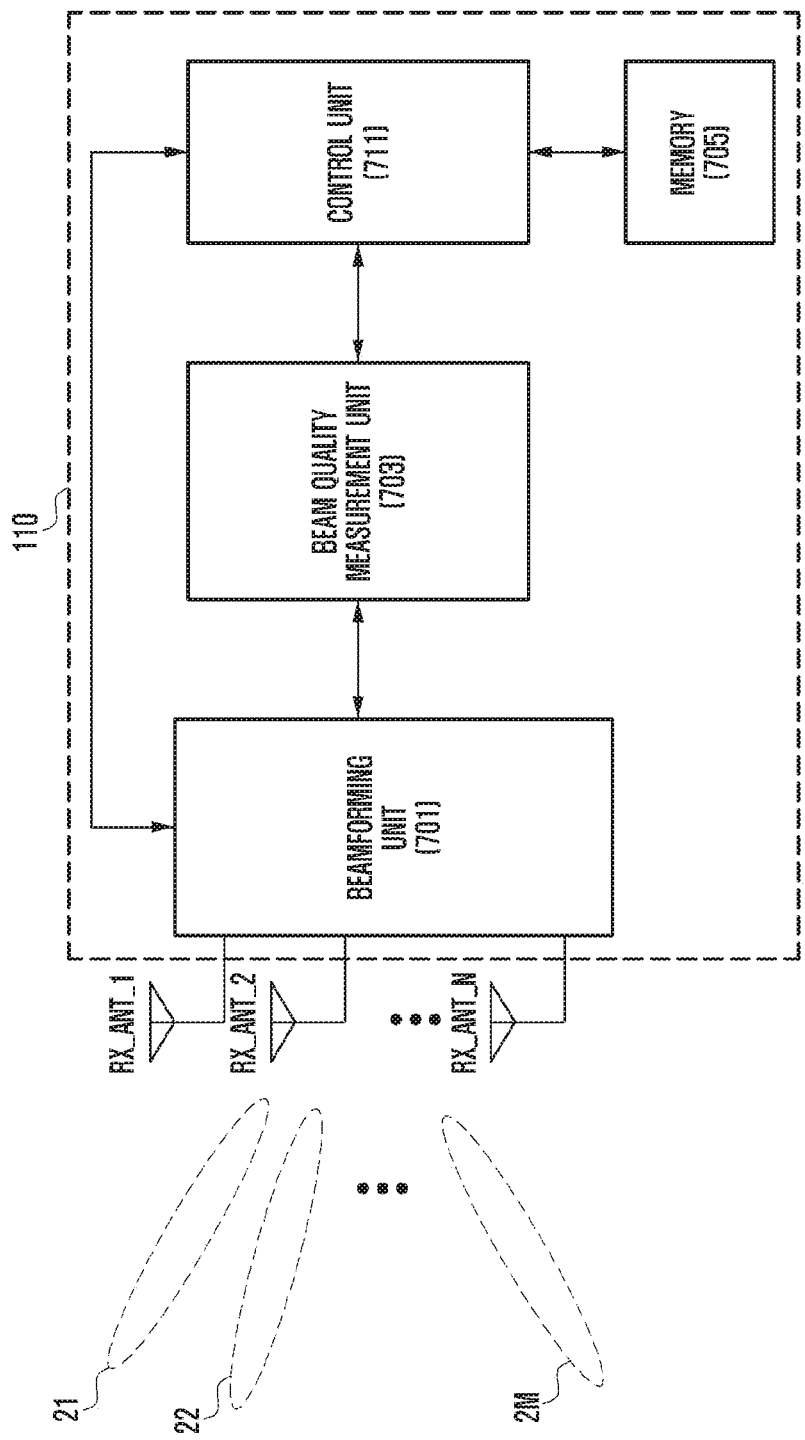
FIG. 7 is a block diagram illustrating a configuration of a receiver according to an embodiment of the present invention.

FIG. 7 is a block diagram illustrating a configuration of a receiver according to an embodiment of the present invention.

In reference to FIG. 7, the receiver 110 may include a beamforming unit 701, a beam quality measurement unit 703, a memory 705, and a control unit 711. A plurality of receive antennas RX_ANT_1, RX_ANT_2, . . . , RX_ANT_N may be connected to the beamforming unit 701.

The beamforming unit 701 may multiply beamforming factors to the receive antennas RX_ANT_1, RX_ANT_2, . . . , RX_ANT_N for beamforming the reception signal in a specific direction. Accordingly, the receive antennas RX_ANT_1, RX_ANT_2, . . . , RX_ANT_N may form the transmission and reception beams in various directions. The beamforming unit may include a radio processing unit for up-converting a baseband signal to a radio signal and down-converting the received signals as beamformed by the receive antennas RX_ANT_1, RX_ANT_2, . . . , RX_ANT_N. The beamforming unit 701 may receive data conveyed by one or more transmission beams through reception beamforming in one or more directions under the control of the control unit 711. At this time, the beamforming unit 701 may perform reception beamforming in a specific direction to receive the transmission beam formed in a specific direction under the control of the control unit 711.

The beamforming unit 701 inputs the signal received through beamforming in to the beam quality measurement unit 703. The beam quality measurement unit 703 measures the quality of each transmission beam under the control of the control unit 711. For example, if the transmitter 100 performs beamforming in two directions and the receiver 110 performs beamforming in two directions, the number of cases is 4. The beam quality measurement unit 703 may check the transmission and reception beam pairs having the reception quality greater than a predetermined threshold among the signals received in the respective cases. The beam quality measurement unit 703 provides the control unit 711 with the information on the transmission and reception beam pairs having the reception quality higher than the threshold value.

The control unit 711 may process the best transmission beam information into a data format available for transmission to the transmitter 100 according to the methods described above with reference to FIGS. 2 to 5. At this time, the control unit 711 may insert the error detection information into the transmission beam information for use in error detection. This information may be transmitted to the transmitter 100 by means of the beam forming unit 701. The detailed descriptions of the above operations have been made above and thus are omitted herein.

The memory 705 may include a region for storing the information necessary for controlling overall operations of the receiver 100, data generated during the control, the transmission beam identity information, reception beam identity information, and other information under the control of the control unit 711. The memory 705 may store the transmission beam information updated successfully between the transmitter 100 and the receiver 110 at the most recently previous timing.

Although various embodiments of the present invention have been described using specific terms, the specification and drawings are to be regarded in an illustrative rather than a restrictive sense in order to help understand the present invention. Thus the scope of the invention should not be construed as being limited to the exemplary embodiments, but rather it should be recognized as contemplating various changes and modifications within the spirit and scope of the invention.

INDUSTRIAL APPLICABILITY

The present invention is applicable to wireless communication systems supporting a beamforming scheme.

The invention claimed is:

1. A communication method of a transmitter in a wireless communication system supporting beamforming-based radio communication, the method comprising:
    transmitting a plurality of transmission beams, wherein each transmission beam includes a reference signal and a transmission beam identifier for identifying the transmission beam;
    receiving beam information from a receiver, the beam information including a plurality of transmission beam identifiers for data communication and error detection information;
    checking the error detection information;
    in response to the received beam information, transmitting a physical downlink control channel (PDCCH) including resource allocation information and at least one identifier based on the plurality of transmission beam identifiers, when no error is detected as the checking result; and
    communicating with the receiver based on the PDCCH.

2. The method of claim 1, wherein the PDCCH including retransmission request, when an error is detected as the checking result.

3. The method of claim 2, wherein the PDCCH is transmitted in a transmission beam updated successfully with the receiver at a most recently previous occasion.

4. The method of claim 1, wherein the PDCCH is transmitted in a transmission beam updated successfully with the receiver at a most recently previous occasion.

5. A communication method of a receiver in a wireless communication system supporting beamforming-based radio communication, the method comprising:
    receiving a plurality of transmission beams form a transmitter, wherein each transmission beam includes a reference signal and a transmission beam identifier for identifying the transmission beam;
    measuring quality of a reference signal included in the transmission beams;
    selecting a plurality of transmission beam identifiers having a best quality for communication among the transmission beams;
    transmitting to the transmitter a beam information including the selected the plurality of transmission beam identifier and error detection information; and
    receiving a physical downlink control channel (PDCCH) including resource allocation information and at least one identifier based on the plurality of transmission beam identifiers; and
    communicating with the transmitter based on the received PDCCH.

6. The method of claim 5, wherein PDCCH including retransmission request, when an error is detected as the checking result.

7. The method of claim 6, wherein PDCCH is transmitted in a transmission beam updated successfully with the transmitter at a most recently previous occasion.

8. The method of claim 5, wherein the PDCCH is transmitted in the beam updated successfully with the transmitter at a most recently previous occasion.

9. A transmitter for communication in a wireless communication system, the transmitter comprising:
    a plurality of antennas;
    a beamforming unit configured to transmit/receive beamforming a plurality of directions through the plurality of antennas;
    an error detection unit configured to check whether an error is detected in a received information;
    a memory configured to store a history of successfully updated beams with a receiver; and
    a controller configured to:
        control the beamforming unit to transmit a plurality of transmission beams, wherein each transmission beam includes a reference signal and a transmission beam identifier for identifying the transmission beam,
        control the beamforming unit to receive beam information from the receiver, the beam information including a plurality of transmission beam identifiers for data communication and error detection information;
        control the error detection unit to check the error detection information;
        control the beamforming unit to transmit a physical downlink control channel, PDCCH, including resource allocation information and at least one identifier based on the plurality of transmission beam identifiers in response to the receiving beam information, when no error is detected as the checking result; and
        control the beamforming unit to communicate with the receiver based on the PDCCH.

10. The transmitter of claim 9, wherein the PDCCH including retransmission request, when an error is detected as the checking result.

11. The transmitter of claim 10, wherein the PDCCH is transmitted in a transmission beam updated successfully with the receiver at a most recently previous occasion.

12. The transmitter of claim 9, wherein the PDCCH is transmitted in a transmission beam updated successfully with the receiver at a most recently previous occasion.

13. A receiver for communication in a wireless communication system, the receiver comprising:
- a plurality of antennas;
- a beamforming unit configured to transmit/receive beamforming a plurality of directions through the plurality of antennas;
- a beam quality measurement unit configured to measure a quality of received transmission beams from a transmitter;
- a memory configured to store a history of successfully updated beams with the transmitter; and
- a controller configured to:
   - control the beamforming unit to receive a plurality of transmission beams form the transmitter, wherein each transmission beam includes a reference signal and a transmission beam identifier for identifying the transmission beam;
   - control the beam quality measurement unit to measure quality of a reference signal included in the transmission beams;
   - select a plurality of transmission beam identifiers having a best quality for communication among the transmission beams;
   - control the beamforming unit to transmit to the transmitter a beam information including the selected the plurality of transmission beam identifier and error detection information; and
   - control the beamforming unit to receive a physical downlink control channel, PDCCH, including resource allocation information and at least one identifier based on the plurality of transmission beam identifiers; and
   - control the beamforming unit to communicate with the transmitter based on the received PDCCH.

14. The receiver of claim 13, wherein PDCCH including retransmission request, when an error is detected as the checking result.

15. The receiver of claim 14, wherein PDCCH is transmitted in a transmission beam updated successfully with the transmitter at a most recently previous occasion.

16. The receiver of claim 13, wherein PDCCH is transmitted in a transmission beam updated successfully with the transmitter at a most recently previous occasion.

\* \* \* \* \*